Patented Nov. 15, 1949

2,488,149

UNITED STATES PATENT OFFICE

2,488,149

EMULSION POLYMERIZATION OF DIOLEFINS IN THE PRESENCE OF AN ALKYL ETHANOLAMINE SOAP

Byron M. Vanderbilt, Westfield, N. J., and Frances Bascom, Staten Island, N. Y., assignors to Standard Oil Development Company, a corporation of Delaware No Drawing. Application July 23, 1946, Serial No. 685,790

8 Claims. (Cl. 260—83.1)

The present invention pertains to improvements in the manufacture of emulsion polymerizates, particularly synthetic rubber-like materials by the polymerization of conjugated diolefins in aqueous emulsion.

Synthetic rubber-like, as well as resinous, materials have been prepared by the polymerization of conjugated diolefins such as butadiene-1,3 and its homologues or by the copolymerization of such diolefins with unsaturated comonomers such as styrene, alpha methyl styrene, para methyl styrene, vinyl naphthalene, chlorostyrenes, acrylonitrile, methacrylonitrile, methyl acrylate, methyl methacrylate, ethyl fumarate, methyl vinyl ketone and the like. The preparation of these polymerizates is usually effected in aqueous emulsion using a compound capable of liberating oxygen such as hydrogen peroxide, benzoyl peroxide, alkali metal or ammonium perborates and persulfates or the like, as polymerization catalyst. It is common practice to provide small amounts of polymerization regulators or modifiers such as aliphatic mercaptans of from 6 to about 18 carbon atoms per molecule or dialkyl xanthogen disulfides, in the polymerization reaction system in order to improve the plasticity of the polymers formed.

The reactants are ordinarily emulsified in from an equal to a two-fold quantity of water utilizing suitable surface active materials in order to form stable emulsions. Materials which have been used as emulsifiers have included water-soluble soaps such as alkali metal and ammonium oleates, palmitates, stearates, and the like, salts of alkylated naphthalene sulfonic acids, fatty alcohol sulfates, aliphatic and olefinic sulfonic acid salts and also acid addition salts of high molecular weight alkyl amines. Of these emulsifiers, soaps have become the most widely used. This has been due in part to their ready availability and relatively low cost and also because of the fact that good polymerization rates are obtained therewith and little or no deposition occurs in the reactors showing good stability of the emulsions prepared therewith. Recently it has been proposed (see U. S. Patent 2,393,133) to utilize as the sole emulsifying agent a soap of a soap-forming monocarboxylic acid having 12 to 20 carbon atoms per molecule and a volatile alkyl mono amine having a boiling point below 160° C. at atmospheric pressure and having an ionization constant equal to at least $1 \times 10^{-4}$ and containing in one molecule of the amine not more than 6 carbon atoms. This patent indicates at page 2, col. 1, lines 26 et seq., that ethanolamine, diethanolamine, triethanolamine and morpholine are excluded by the specific requirements of the soap-forming amine because these materials all have an ionization constant of less than $1 \times 10^{-4}$ and/or too high boiling.

It is the object of this invention to provide the art with certain novel soap-type emulsifiers for the preparation of conjugated diolefin polymers.

It is also the object of this invention to carry out the polymerization of conjugated diolefins in the presence of certain novel soap-type emulsifiers.

These and other objects will appear more clearly from the detailed specification and claims which follow.

We have now found that superior rubbery products can be obtained by the polymerization of conjugated diolefins if certain hydroxy amines, such as diethylamino ethanol, are used for preparing the soap emulsifier. The nature of the hydroxy amine must be quite specific in order to form suitable emulsifiers. The hydroxy amine must contain at least one alkyl substituent on the N-atom and that alkyl group must not be too large or too small. The hydroxy amines which we have found to be suitable correspond to the general formula

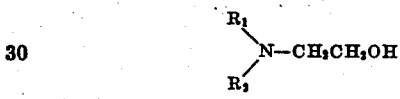

wherein $R_1$ stands for an alkyl radical of from 2 to 6 carbon atoms, $R_2$ stands for a member of the group consisting of hydrogen, alkyl and hydroxyethyl, and when $R_2$ stands for alkyl, the total number of carbon atoms in $R_1$ and $R_2$ is between 3 and 6. Suitable amines of this type include methyl ethyl ethanolamine, diethyl ethanolamine, monobutyl ethanolamine and monobutyl diethanolamine, amyl ethanolamine, methyl amyl ethanolamine, hexyl ethanolamine, ethyl butyl ethanolamine, dipropyl ethanolamine and the like. We have also found that although dimethyl ethanolamine is unsatisfactory as the amine for forming soap emulsifiers in that low conversions are obtained therewith, it is possible by modifying the structure of the amine to obtain an alkanol amine of four carbon atoms, i. e., same molecular weight as dimethyl ethanolamine which forms soaps which are suitable as emulsifiers for our purposes. Specifically, we have found that 2-methyl-2-amino propanol is a satisfactory alkanol amine.

The foregoing substituted ethanolamines may be reacted with any of the ordinary soap-forming fatty acids such as aliphatic monocarboxylic acids of from 12 to 20 carbon atoms per molecule, such as myristic, palmitic, oleic, stearic and mixtures of these acids, such as are obtained, for example, by hydrolyzing tallow, distilling off the liberated fatty acids and selectively hydrogenating the acid mixture to remove all or a major proportion of the polyolefinic acids. We may also use abietic acid in preparing the emulsifiers in accordance with the present invention.

The alkanol amines and the soap-forming fatty acids are ordinarily used in equimolar amounts in preparing our soap emulsifiers. We can, however, utilize less than equimolar amounts of amine, for example, as little as 40% of the amount theoretically necessary to neutralize the acid and thereby provide free fatty acid in the reaction system as will become more apparent from the specific examples, or we may use as much as about a 20% excess of amine to provide free amine in the reaction system.

The soaps in accordance with the present invention are applicable to the emulsion polymerization of conjugated diolefins generally, either taken singly or in mixtures, to the copolymerization of conjugated diolefins with compounds containing a single $>C=CH_2$ linkage and capable of forming copolymerizates with conjugated diolefins in aqueous emulsion, as well as to the polymerization of vinyl-type compounds such as styrene, substituted styrenes, acrylonitriles, acrylic acid esters and unsaturated ketones. Such conjugated diolefins which may be polymerized or copolymerized in aqueous emulsion using the soap-type emulsifiers of the present invention include butadiene-1,3 and the homologues thereof such as isoprene, piperylene, dimethyl-butadiene, methyl pentadiene and the like, as well as the 2-halogenobutadienes particularly 2-chloro- and 2-bromobutadiene-1,3. Compounds which may be polymerized by themselves or copolymerized with the above-mentioned dienes include styrene, alpha methyl styrene, para methyl styrene, para methoxy styrene, chloro styrenes, para bromo styrene, acrylonitrile, methacrylonitrile, acrylic and methacrylic acid esters, such as methyl acrylate or methyl methacrylate, fumaric acid esters such as ethyl fumarate and unsaturated ketones such as methyl vinyl ketone or methyl isopropenyl ketone.

As catalysts for the polymerization, there may be used many well known compounds which are capable of liberating oxygen under the reaction conditions applied, such as hydrogen peroxide, benzoyl peroxide, perborates or persulfates of ammonia or the alkali metals. We may also provide a polymerization modifier or regulator such as a dialkyl xanthogen disulfide or an aliphatic mercaptan of from 6 to 18 carbon atoms per molecule in the reaction system. Suitable mercaptans which may be used include hexyl, heptyl, diisobutyl, decyl, dodecyl, octadecyl and benzyl mercaptans, a preferred modifier being a mixture of aliphatic mercaptans obtained from commercial lauryl alcohol and containing at least 50% dedecyl mercaptan, the remaining 50% being mercaptans containing from 10 to 16 carbon atoms.

The polymerization is conducted as usual at temperatures of from about 15° C. to about 60° C. and is ordinarily terminated when about 75% of the monomers are converted to polymers.

The following examples illustrate the present invention, but it is to be understood that this invention is not limited thereto. Parts given in polymerization and compounding recipes are by weight.

Example 1

A series of runs were made using the following polymerization recipe:

| | Parts |
|---|---|
| Butadiene | 72 |
| Styrene | 28 |
| Water | 200 |
| Tallow acid | 4 |
| Dodecyl mercaptan | 0.5 |
| Potassium persulfate | 0.3 |
| Hydroxyamine | Variable |

All runs were carried out in pressure bottles which were rotated in a constant temperature water bath. Temperature was 45° C. and the reaction time in all cases was 15½ hours. The following amines were used in the theoretical amounts to neutralize the fatty acid. Reaction yields when using various hydroxyamines were as follows:

| Amine used: | Per cent Conversion |
|---|---|
| Monoethyl ethanolamine | 53 |
| Diethyl | 79 |
| Monobutyl | 77 |
| Dibutyl | 23 |
| Monobutyl diethanolamine | 83 |
| Dimethyl ethanolamine | 25 |
| Triethanolamine | 0 |
| Ethyl phenyl ethanolamine | 0 |

It may be seen that if the N-substituted groups are too large, such as dibutyl or too small as dimethyl a low conversion is obtained. If no alkyl substituent groups are present, as in di- or triethanolamine, no yield is obtained.

Although the monobutyl substituted ethanolamines cited above give yields comparable to that of diethyl ethanolamine, we prefer the latter because of cheapness and because more stable latices are obtained when using soaps of this amine.

The above run was repeated using 4 parts of lauric acid neutralized with the theoretical amount of diethyl ethanolamine. Conversion was 72%. When 4% of oleic acid was used, a conversion of 68% was obtained. These runs show that other fatty acids are applicable besides tallow acid, but as in the case of the alkali metal soaps, the acids from tallow are better than oleic which contains appreciable quantities of linoleic. Lauric acid is less desirable for this purpose than are the $C_{14}$ and $C_{15}$ saturated acids.

Example 2

When preparing the Buna S type copolymer using diethyl ethanolamine soap it has been found possible to vary the proportion of amine to fatty acid considerably without greatly affecting reaction rate or product quality. The experiments cited below were carried out as per Example 1 except that the amount of diethyl ethanolamine was varied.

| Percent Neutralization of the Fatty Acid | Percent Conversion | Mooney | |
|---|---|---|---|
| | | 2' | 4' |
| 90 | 75 | 33 | 31 |
| 100 | 77 | 35 | 33 |
| 110 | 78 | 44 | 43 |
| NaOH, 100 [1] | 72 | 28 | 26 |

[1] Sodium soap of corresponding fatty acid.

It may be seen that an excess of the amine does not poison the reaction but it does cause a slightly tougher product to be formed.

The products obtained in the above four mentioned experiments were vulcanized using the following compounding recipe:

| | Parts |
|---|---|
| Polymer | 100 |
| Pelleted, easy-processing channel black | 50 |
| Coal tar | 5 |
| Zinc oxide | 5 |
| Sulfur | 5 |
| Stearic acid | 2 |
| Mercaptobenzothiazole | 1.5 |

The following physical properties were obtained on the vulcanizates:

| Base Used | Tensile | | | Percent Elongation | | | Modulus—300% | | |
|---|---|---|---|---|---|---|---|---|---|
| | 25' [1] | 50' | 90' | 25' | 50' | 90' | 25' | 50' | 90' |
| Et₂N(CH₂CH₂OH), 90% | 2,440 | 2,950 | 2,930 | 920 | 730 | 650 | 430 | 780 | 1,000 |
| Et₂N(CH₂CH₂OH), 100% | 2,100 | 3,120 | 3,210 | 940 | 770 | 630 | 130 | 770 | 1,000 |
| Et₂N(CH₂CH₂OH), 110% | 2,500 | 3,020 | 3,190 | 870 | 660 | 620 | 530 | 1,010 | 1,170 |
| NaOH, 100% | 3,070 | 2,990 | 2,540 | 790 | 650 | 510 | 610 | 1,010 | 1,180 |

[1] Cure times in minutes at 292° F.

It may be noted that the polymers prepared using the diethyl ethanolamine have less tendency to overcure than those prepared with an alkali soap.

Example 3

Pressure bottle runs were carried out to prepare diolefin-nitrile copolymers using the following polymerization formula:

| | Parts |
|---|---|
| Butadiene | 74 |
| Acrylonitrile | 26 |
| Water | 200 |
| Tallow acid | 4 |
| Dodecyl mercaptan | 0.5 |
| Potassium persulfate | 0.3 |
| Diethyl ethanolamine | Variable |

Reaction time was 16 hours at 25° C. When 80% or more of the theoretical amount of diethyl ethanolamine was used to neutralize the fatty acid, bad coagulation was obtained in the bottle polymerizers. The following data are typical when using lower degrees of neutralization:

| Fatty Acid Neutralized— | Conversion | Mooney | | Tensile-Elongation |
|---|---|---|---|---|
| | | 2' | 4' | |
| 70 per cent | 80½ | 116 | 121 | 4,470-590% |
| 60 per cent | 74½ | 77 | 73 | 4,320-620% |
| 50 per cent | 74 | 45 | 40 | 4,280-670% |

It may be noted that a much softer product is obtained at 50% neutralization (lower pH) than at 60 to 70% neutralization. Also the physical properties are equally good.

Example 4

A run was carried out in a 3-gallon autoclave equipped with turbine agitation using diethyl ethanolamine soap (50% neutralized) for preparing a butadiene-acrylonitrile copolymer.

Charge:

| | Grams |
|---|---|
| Acrylonitrile | 676 |
| Butadiene | 1924 |
| Water | 5200 |
| Tallow acid | 130 |
| Diethyl ethanolamine | 27.8 |
| Potassium persulfate | 7.8 |
| Dodecyl mercaptan | 13 |

The reaction was 78% complete after 12 hours at 33° C. The product had a 2-minute Mooney of 60 and processed more easily on a mill than the present commercial product of like plasticity. When using a compounding recipe of

| | Parts |
|---|---|
| Polymer | 100 |
| Hard-processing channel black | 50 |
| Zinc oxide | 5 |
| Benzothiazyl disulfide | 1 |
| Stearic acid | 2 |
| Sulfur | 1.5 | and curing at 265° F. the following data were obtained.

| Cure Time | Tensile | 300% Modulus | Per Cent Elongation |
|---|---|---|---|
| 45 minutes | 1,850 | 400 | 840 |
| 60 minutes | 2,920 | 910 | 705 |
| 90 minutes | 3,300 | 1,425 | 550 |
| 120 minutes | 3,805 | 1,795 | 525 |

These data show this polymer to be of very high quality even though it was prepared of low Mooney in order to get good processing properties.

The foregoing description contains a limited number of embodiments of the present invention. It will be understood, however, that the latter is not limited to the specific details disclosed since numerous variations are possible without departing from the scope of the following claims.

What we claim and desire to secure by Letters Patent is:

1. In the process of producing copolymerizates of conjugated diolefins of from 4 to 6 carbon atoms per molecule and styrene in aqueous emulsion, the improvement which consists of using as the emulsifying agent a water-soluble reaction product of a soap-forming fatty acid of from 12 to 18 carbon atoms and an amine of the general formula

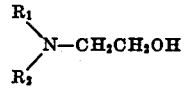

wherein $R_1$ stands for an alkyl radical of from 2 to 6 carbon atoms, $R_2$ stands for a member of the group consisting of hydrogen, alkyl of from 1 to 4 carbon atoms, and hydroxyethyl, the total number of carbon atoms in $R_1$ and $R_2$ being between 3 and 6 when $R_2$ stands for a member selected from the group consisting of alkyl and hydrogen, said emulsifying agent having an acid-to-amine mol ratio between 100/40 and 100/120.

2. In the process of producing copolymerizates of conjugated diolefins of from 4 to 6 carbon atoms per molecule and acrylonitrile in aqueous emulsion, the improvement which consists of using as the emulsifying agent a water-soluble reaction product of a soap-forming fatty acid of from 12 to 18 carbon atoms and an amine of the general formula

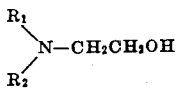

wherein $R_1$ stands for an alkyl radical of from 2 to 6 carbon atoms, $R_2$ stands for a member of the group consisting of hydrogen, alkyl of from 1 to 4 carbon atoms, and hydroxyethyl, the total number of carbon atoms in $R_1$ and $R_2$ being between 3 and 6 when $R_2$ stands for a member selected from the group consisting of alkyl and hydrogen, said emulsifying agent having an acid-to-amine mol ratio between 100/40 and 100/70.

3. In the process of producing copolymers of conjugated diolefins having from 4 to 6 carbon atoms per molecule with a comonomer selected from the group consisting of acrylonitriles and styrenes, the improvement which consists of using as the emulsifying agent a water-soluble reaction product of a soap-forming fatty acid having from 12 to 18 carbon atoms and an amine of the general formula

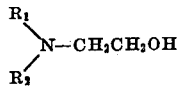

wherein $R_1$ stands for an alkyl radical having from 2 to 6 carbon atoms, and wherein $R_2$ stands for a member of the group consisting of hydrogen, alkyl of 1 to 4 carbon atoms, and hydroxyethyl, the total number of carbon atoms in $R_1$ plus $R_2$ being between 3 and 6 when $R_2$ stands for a member of the group consisting of alkyl and hydrogen, said emulsifying agent having an acid-to-amine mol ratio between 100/40 and 100/70 when the comonomer is an acrylonitrile, and between 100/40 and 100/120 when the comonomer is a styrene.

4. In the process of producing copolymers of butadiene and styrene in aqueous emulsion, the improvement which consists of using as the emulsifying agent a soap-forming fatty acid having from 12 to 18 carbon atoms neutralized with 90% to 110% of a mol equivalent of diethyl ethanolamine.

5. The process defined by claim 4 wherein the acid is tallow acid.

6. In the process of producing copolymers of butadiene and acrylonitrile in an aqueous emulsion, the improvement which consists of using as the emulsifying agent a soap-forming fatty acid having from 12 to 18 carbon atoms per molecule neutralized with 50% to 70% of a mol equivalent of diethyl ethanolamine.

7. The process defined by claim 3 wherein the amine is monobutyl ethanolamine.

8. The process defined by claim 3 wherein the amine is monobutyl diethanolamine.

BYRON M. VANDERBILT.
FRANCES BASCOM.

REFERENCES CITED

The following references are of record in the file of this patent:

UNITED STATES PATENTS

| Number | Name | Date |
| --- | --- | --- |
| 2,278,415 | Arnold | Apr. 7, 1942 |
| 2,279,293 | Clifford | Apr. 14, 1942 |
| 2,393,133 | White | Jan. 15, 1946 |